(12) United States Patent
Deng et al.

(10) Patent No.: US 12,172,595 B2
(45) Date of Patent: Dec. 24, 2024

(54) AFT-VEHICLE AIRBAG

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/181,918

(22) Filed: Mar. 10, 2023

(65) Prior Publication Data

US 2024/0300436 A1    Sep. 12, 2024

(51) Int. Cl.
*B60R 21/232* (2011.01)
*B60R 21/213* (2011.01)
*B60R 21/231* (2011.01)
*B60R 21/262* (2011.01)

(52) U.S. Cl.
CPC .......... *B60R 21/232* (2013.01); *B60R 21/213* (2013.01); *B60R 21/262* (2013.01); *B60R 2021/23153* (2013.01)

(58) Field of Classification Search
CPC .... B60R 2021/0072; B60R 2021/0083; B60R 2021/23153; B60R 2021/23192; B60R 2021/23308; B60R 2021/2612; B60R 2021/2615; B60R 2021/2617; B60R 21/213; B60R 21/214; B60R 21/23138; B60R 21/232; B60R 21/233; B60R 21/261; B60R 21/262
See application file for complete search history.

(56) References Cited

U.S. PATENT DOCUMENTS

| 2,834,606 | A  | * | 5/1958 | Bertrand | B60R 21/20 D12/400 |
| 6,113,132 | A  | * | 9/2000 | Saslecov | B60R 21/20 280/730.1 |
| 6,123,355 | A  | * | 9/2000 | Sutherland | B60R 21/232 280/736 |
| 6,293,581 | B1 | * | 9/2001 | Saita | B60R 21/213 280/730.2 |
| 6,406,059 | B1 |   | 6/2002 | Taubenberger et al. | |
| 6,457,740 | B1 | * | 10/2002 | Vaidyaraman | B60R 21/232 280/730.2 |
| 6,481,743 | B1 | * | 11/2002 | Tobe | B60R 21/232 280/730.2 |

(Continued)

FOREIGN PATENT DOCUMENTS

| DE | 102014213162 A1 | * | 1/2016 | ............ B60R 21/20 |
| EP | 0927667 B1 | | 3/2003 | |

(Continued)

*Primary Examiner* — Laura Freedman
(74) *Attorney, Agent, or Firm* — Frank A. MacKenzie; Bejin Bieneman PLC (57) ABSTRACT

A vehicle includes a vehicle roof, a liftgate rotatably connected to the vehicle roof, and an airbag. The airbag has a first segment supported by the vehicle roof and a second segment supported by the liftgate. The first segment of the airbag defines a first inflation chamber and the second segment of the airbag defines a second inflation chamber. The airbag includes a conduit fluidly connecting the first inflation chamber and the second inflation chamber.

18 Claims, 8 Drawing Sheets

(56) References Cited

U.S. PATENT DOCUMENTS

| | | | |
|---|---|---|---|
| 6,595,546 B2 * | 7/2003 | Smith | B60R 21/2644 |
| | | | 280/730.2 |
| 6,695,342 B2 * | 2/2004 | Tanase | B60R 21/232 |
| | | | 280/730.2 |
| 6,805,374 B2 * | 10/2004 | Saderholm | B60R 21/232 |
| | | | 280/730.2 |
| 6,848,708 B2 * | 2/2005 | Green | B60R 21/232 |
| | | | 280/730.2 |
| 6,991,255 B2 * | 1/2006 | Henderson | B60R 21/232 |
| | | | 280/730.2 |
| 7,237,798 B2 * | 7/2007 | Mori | B60R 21/26 |
| | | | 280/743.1 |
| 7,290,798 B2 * | 11/2007 | Mori | B60R 21/214 |
| | | | 280/743.1 |
| 7,364,185 B2 * | 4/2008 | Mori | B60R 21/214 |
| | | | 280/749 |
| 7,461,858 B2 * | 12/2008 | Hirata | B60R 21/2338 |
| | | | 280/730.2 |
| 7,469,923 B2 * | 12/2008 | Ryan | B60R 21/232 |
| | | | 280/730.2 |
| 7,708,308 B2 * | 5/2010 | Abney, III | B60R 21/233 |
| | | | 280/730.2 |
| 7,789,418 B2 | 9/2010 | Wipasuramonton et al. | |
| 7,878,530 B2 * | 2/2011 | Mizuno | B60R 21/214 |
| | | | 280/730.2 |
| 7,909,357 B2 * | 3/2011 | Lida | B60R 21/233 |
| | | | 280/730.2 |
| 8,033,569 B2 * | 10/2011 | Yamanishi | B60R 21/232 |
| | | | 280/730.2 |
| 8,091,917 B2 * | 1/2012 | Weyrich | B60R 21/237 |
| | | | 280/730.2 |
| 8,235,418 B2 * | 8/2012 | Slaats | B60R 21/232 |
| | | | 280/730.2 |
| 8,393,642 B2 * | 3/2013 | Nakaya | B60R 21/207 |
| | | | 297/216.12 |
| 8,419,051 B2 * | 4/2013 | Kobayashi | B60R 21/201 |
| | | | 280/730.2 |
| 9,205,801 B2 | 12/2015 | Osterfeld et al. | |
| 10,442,386 B2 * | 10/2019 | Hioda | B60R 21/213 |
| 11,613,224 B2 * | 3/2023 | Eddings | B60R 21/13 |
| | | | 280/756 |
| 12,043,197 B1 * | 7/2024 | Deng | B60R 21/233 |
| 2006/0055153 A1 | 3/2006 | Hirata | |
| 2006/0097491 A1 * | 5/2006 | Saberan | B60R 21/232 |
| | | | 280/730.2 |
| 2007/0013178 A1 * | 1/2007 | Aird | B60R 21/26 |
| | | | 280/730.2 |
| 2011/0057424 A1 | 3/2011 | Fink et al. | |

FOREIGN PATENT DOCUMENTS

| | | | | |
|---|---|---|---|---|
| JP | 2005041460 A | * | 2/2005 | ......... B60R 21/213 |
| JP | 2005096652 A | * | 4/2005 | ......... B60R 21/232 |
| JP | 2006082731 A | * | 3/2006 | |
| JP | 2006103660 A | * | 4/2006 | |
| JP | 2008189023 A | * | 8/2008 | |
| JP | 2008189073 A | * | 8/2008 | |
| JP | 2009241692 A | * | 10/2009 | |
| JP | 2010083216 A | * | 4/2010 | ......... B60R 21/232 |
| JP | 2010254188 A | * | 11/2010 | |
| JP | 2011005912 A | * | 1/2011 | |
| JP | 2011005943 A | * | 1/2011 | |
| WO | 2011045229 A2 | | 4/2011 | |

\* cited by examiner

AFT-VEHICLE AIRBAG

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during the vehicle impact. The airbag assemblies may be located at various positions in a passenger compartment of the vehicle. Vehicles may include airbags supported on a dash, side air curtains mounted to roof rails, seat-mounted airbag, etc.

DETAILED DESCRIPTION

A vehicle includes a vehicle roof, a liftgate rotatably connected to the vehicle roof, and an airbag having a first segment supported by the vehicle roof and a second segment supported by the liftgate. The first segment of the airbag defines a first inflation chamber and the second segment of the airbag defines a second inflation chamber. The airbag includes a conduit fluidly connecting the first inflation chamber and the second inflation chamber.

The conduit may be flexible relative to the vehicle roof and the liftgate.

The first segment, the second segment, and the conduit may be fabric.

The liftgate may be moveable relative to vehicle roof between a closed position and an open position. The second segment may be moveable with the liftgate between closed position and open position.

The vehicle may include a seat having a seatback, the second segment of the airbag being inflatable to an inflated position adjacent the seatback.

The vehicle may include a seat having a seatback and a head restraint supported by the seatback, the second segment of the airbag being inflatable to an inflated position above the seatback and vehicle-outboard of the head restraint.

The vehicle may include a seat, the liftgate being above the seat.

The first segment of the airbag may be inflatable to an inflated position elongated in a direction vehicle-forward from the second segment.

The vehicle may include a front vehicle door and a rear vehicle door, the first segment being inflatable to an inflated position extending along the front vehicle door and the rear vehicle door.

The vehicle may include an inflator in fluid communication with the first segment, the second segment, and the conduit. The inflator may be in fluid communication directly with the first segment and the conduit and the second segment are inflatable with inflation medium from the inflator through the first segment. The vehicle may include a diffuser tube extending through the first segment from the inflator to the conduit. The inflator may be supported by the vehicle roof.

The first segment may include a first leg inflatable to an inflated position elongated vehicle-forward of the second segment and a second leg inflatable to an inflated position elongated cross-vehicle from the first leg. The vehicle may include a seat having a seatback, the second segment of the airbag being inflatable to an inflated position adjacent the seatback and the first leg of the first segment of the airbag being inflatable to an inflated position vehicle-forward of the seatback.

The seat includes a head restraint supported by the seatback, the second segment in the inflated position being vehicle-outboard of the head restraint and the second leg of the first segment in the inflated position being vehicle-forward of the head restraint.

The first segment and the second segment are elongated along a vehicle-longitudinal axis.

With reference to the Figures, wherein like numerals indicate like parts throughout the several views, a vehicle 10 includes a vehicle roof 12, a liftgate 14 rotatably connected to the vehicle roof 12, and an airbag 16. The airbag 16 has a first segment 18 supported by the vehicle roof 12 and a second segment 20 supported by the liftgate 14. The first segment 18 of the airbag 16 defines a first inflation chamber 22 and the second segment 20 of the airbag 16 defines a second inflation chamber 24. The airbag 16 includes a conduit 26 fluidly connecting the first inflation chamber 22 and the second inflation chamber 24.

The conduit 26 allows both for opening of the liftgate 14 when the vehicle 10 is stopped as well as fluidly connecting the first segment 18 and the second segment 20 for inflation during operation of the vehicle 10 when the liftgate 14 is closed. Since the conduit 26 fluidly connects the first segment 18 to the second segment 20, the conduit 26 allows for movement of the liftgate 14 relative to the vehicle roof 12 between a closed position and an open position. In the closed position, during operation of the vehicle 10, the fluid connection between the first segment 18 and the second segment 20 provided by the conduit 26 allows for inflation of the first chamber and the second chamber to control the kinematics of the occupant, as described further below.

Figure 1:
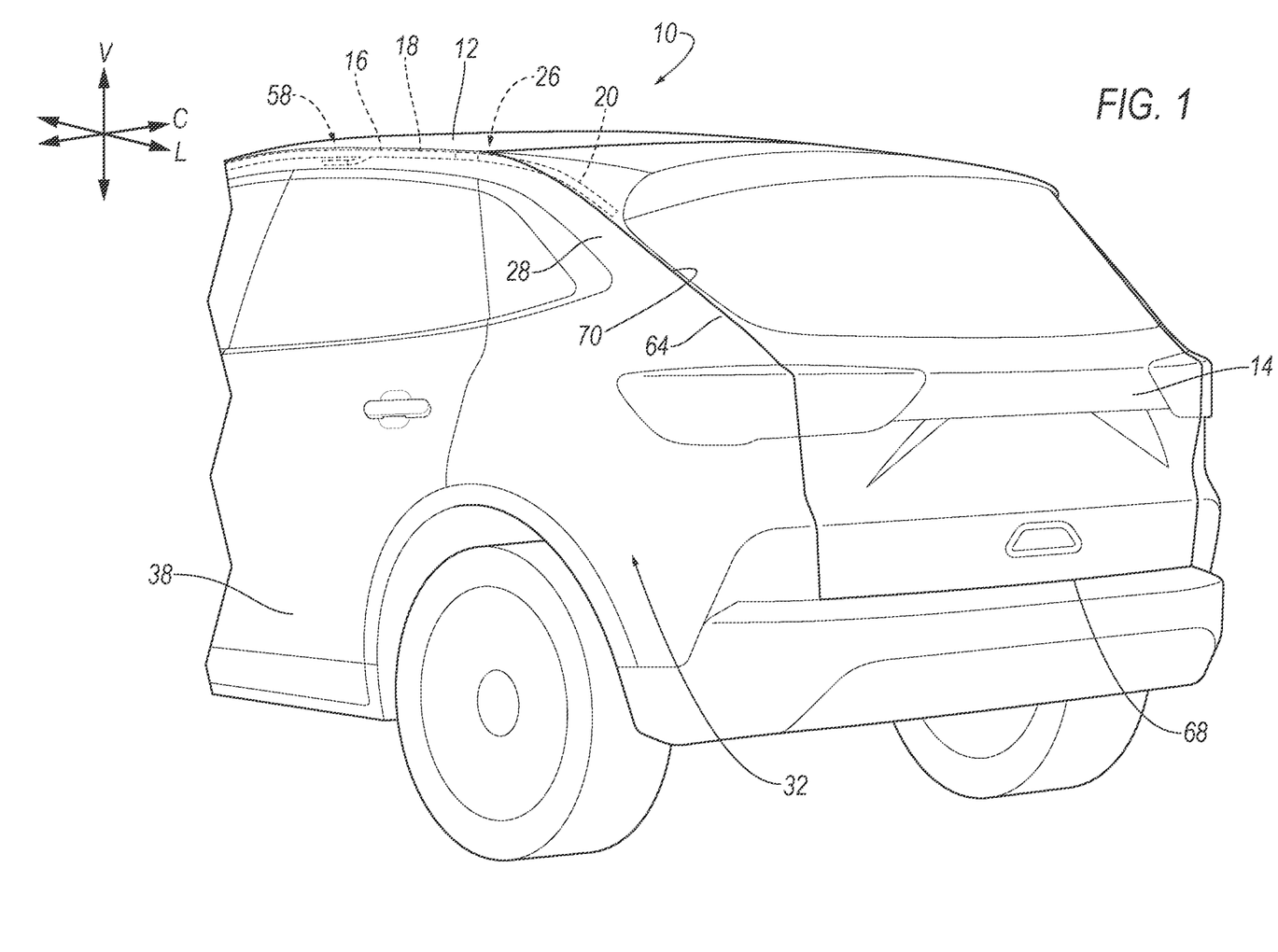
FIG. 1 is a perspective view of a rear of the vehicle with a liftgate in a closed position.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10 can include a system or systems for autonomously or semi-autonomously operating the vehicle 10, e.g., an advanced driver assist system ADAS for speed control, lane-keeping, etc.

The vehicle 10 includes the vehicle body. The vehicle body may be of a unibody construction, a body-on-frame construction, or any suitable construction. In the unibody construction, the vehicle body serves as a frame, and the vehicle body (includes the rockers, pillars, roof rails, etc.) is unitary, i.e., a continuous one-piece unit. As another example, in body-on-frame construction (also referred to as a cab-on-frame construction), the vehicle body and frame are separate components, i.e., are modular, and the vehicle body is supported on and affixed to the frame. In other examples, the vehicle body may have any suitable construction. The vehicle body may be of any suitable material, for example, steel, aluminum, etc.

The vehicle body includes the vehicle roof 12, vehicle pillars (e.g., rear pillar 28), body panels, a vehicle floor 30, etc. The vehicle body defines the passenger compartment to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

With reference to FIG. 1, the vehicle 10 defines a vehicle-longitudinal axis L extending between a front end (not numbered) and a rear-end (not numbered) of the vehicle 10. The vehicle 10 defines a vehicle-lateral axis C extending cross-vehicle 10 from one side to the other side of the vehicle 10. The vehicle 10 defines a vertical axis V extending through the vehicle floor 30 and the vehicle roof 12. The vehicle-longitudinal axis L, the vehicle-lateral axis C, and the vertical axis V are perpendicular relative to each other.

The vehicle roof 12 and the vehicle floor 30 are spaced from each other. Specifically, the vehicle floor 30 is spaced below the vehicle roof 12. The vehicle roof 12 defines the upper boundary of the passenger compartment and may extend from the front end of the passenger compartment to the rear end of the passenger compartment. The vehicle roof 12 may include roof rails and a roof panel extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor 30 defines the lower boundary of the passenger compartment and may extend from the front end of the passenger compartment to the rear end of the passenger compartment. The vehicle floor 30 may include upholstery, for example, carpet, and may have a class-A surface facing the passenger compartment, i.e., a surface specifically manufactured to have a high quality, finished, aesthetic appearance free of blemishes.

The vehicle body includes a body side 32. Specifically, the vehicle body includes two body sides 32 spaced cross vehicle 10 from each other. The body side 32 is a side of the body located vehicle-outboard of the passenger compartment. The body side 32 may be spaced cross-vehicle 10 from the longitudinal axis of the vehicle 10 and may be elongated along the longitudinal axis. The body side 32 includes one or more door openings. The vehicle floor 30 extends from one body side 32 to the other body side 32 and the vehicle roof 12 extends from one body side 32 to the other body side 32.

The vehicle body, specifically each body side 32, may include pillars. In some examples, the pillars on the same body side 32 are separated by one of the door openings 34. For example, the vehicle body may include a front pillar on each side of the vehicle 10. The front pillar may extend between a windshield and a front door 36 and other pillars may be behind the front door 36s, e.g., between adjacent doors. The vehicle body may include a rear pillar 28 on each side of the vehicle 10. The liftgate 14 may extend from one of the rear pillars 28 to the other of the rear pillars 28. The vehicle 10 may include any suitable number of pillars on either body side 32. The pillars 28 may extend from the roof to the floor.

The vehicle 10 includes vehicle doors openable for occupants to enter and exit a passenger cabin. In the example shown in the Figures, the vehicle 10 includes a front door 36 and a rear door 38 on each body side 32. The front door 36 is vehicle-forward of the rear door 38 along the longitudinal axis L of the vehicle 10. Each vehicle door includes at least one door panel and the door-trim panel supported on the door panel. Specifically, the vehicle door may include two panels, namely a door inner and a door outer. In such an example, the door-trim panel and the door outer are fixed to the door inner. The door-trim panel is positioned opposite the door outer. The door-trim panel is inboard relative to the door inner, and the door outer is outboard relative to the door inner. The vehicle door includes a window opening that may be completely closed by a window of the window is in a fully raised position. The door outer faces outboard relative to the vehicle 10. The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.). The door inner may be metal (such as steel, aluminum, etc.) or polymeric (such as fiber reinforced plastic composite, etc.). The door inner provides structural rigidity for the door outer. The door inner may provide a mounting location for components of the door. The door-trim panel may include a covering. The covering may include upholstery, padding, etc. The upholstery may be cloth, leather, faux leather, or any other suitable material. The padding may be foam or any other suitable material. The door-trim panel may be a material suitable for an interior of the vehicle 10, such as vinyl, plastic, leather, wood, etc.

With reference to FIGS. 1-4, 6, and 8, the vehicle 10 may include one or more seats 40. Specifically, the vehicle 10 may include any suitable number of seats 40. The seats 40 are supported by the vehicle floor 30 (not numbered). The seats 40 may be arranged in any suitable arrangement in the passenger compartment. One or more of the seats 40 may be at the front end of the passenger compartment, e.g., a front row of seats 40. One or more of the seats 40 may be behind the front end of the passenger compartment, e.g., at the rear end of the passenger compartment as a rear row 50 of seats 40. In the example shown in the Figures, the vehicle 10 includes seats 40 are arranged as a rear row 50 of seats 40. The rear row 50 of seats 40 in the Figures may be, in some examples, a second row or a third row of seats 40. The seats 40 may be movable relative to the vehicle floor 30 to various positions, e.g., movable fore-and-aft and/or cross-vehicle 10. The seats 40 may be of any suitable type, e.g., a bucket seat, bench seat, etc.

Each of the seats 40 include a seatback 42, a seat bottom 44, and a head restraint 46. The head restraint 46 may be supported by and extends upwardly from the seatback 42. In other words, in such an example the weight of the head restraint 46 is borne by the seatback 42. The head restraint 46 may be connected directly to the seatback 42, as shown in the example shown in the Figures. The head restraint 46 may be stationary or movable relative to the seatback 42. The seatback 42 may be supported by the seat bottom 44 and may be stationary or movable relative to the seat bottom 44. The seatback 42 may extend from an upper end to a lower end. The lower end may be connected to the seat bottom 44. The upper end of the seatback 42 may be spaced upwardly from the lower end of the seatback 42, i.e., upwardly from the seat bottom 44. The head restraint 46 may extend upwardly from the upper end of the seatback 42. The seatback 42, the seat bottom 44, and the head restraint 46 may be adjustable in multiple degrees of freedom. Specifically, the seatback 42, the seat bottom 44, and the head restraint 46 may themselves be adjustable. In other words, adjustable components within the seatback 42, the seat bottom 44, and the head restraint 46 may be adjustable relative to each other.

The body side 32 includes at least one door opening. The door opening may be between two pillars and between a sill and the vehicle roof 12. In the example, shown in the Figures the body side 32 includes a front door opening 52 and a rear door opening 54 adjacent the rear row 50 of seats 40. The door opening extends uninterrupted from one pillar to another pillar. The door opening extends uninterrupted from the vehicle floor 30 to the vehicle roof 12. The door opening allows for ingress and egress into the passenger compartment. The vehicle 10 may include any suitable number of door openings to allow for ingress and egress into the passenger compartment. For example, the vehicle 10 may include one door opening on each side of the vehicle 10. In other examples, the vehicle 10 may include multiple door openings on each body side 32 of the vehicle 10.

The liftgate 14 is openable at a rear of the vehicle 10 to provide access to the passenger compartment, e.g., to a cargo area of the passenger compartment. The liftgate 14 is movable between the open position, shown in broken lines in FIG. 3, allowing access to the cargo area and a closed position, shown for example in FIG. 2, inhibiting access to the cargo area and enclosing the passenger compartment. The liftgate 14 may pivot between the open position and the closed position. The liftgate 14 may include a window opening and a window disposed in the window opening. A hinge 60 may connect the liftgate 14 to the vehicle roof 12, as described further below.

The liftgate 14 includes panels, e.g., metal panels, and the hinge 60 is connected to one of the panels. The liftgate 14 may include one or more trim panels supported on the panels of the liftgate 14. The trim panels face the passenger compartment when the liftgate 14 is in the closed position. In such an example, the trim panels may include upholstery, padding, etc., including cloth, leather, faux leather, vinyl, plastic, leather, wood, etc.

The liftgate 14 includes a first end 62, a second end 64, a third end 66, and a fourth end 68. The liftgate 14 terminates at the first end 62, the second end 64, the third end 66, and the fourth end 68, i.e., the first end 62, second end 64, third end 66, and fourth end 68 define outer boundaries of the liftgate 14. The first end 62, second end 64, third end 66, and fourth end 68 are adjacent the vehicle body when the liftgate 14 is in the closed position. Specifically, the vehicle body defines a liftgate opening 70 and liftgate 14 is rotatable relative to the vehicle body between the closed position covering the liftgate opening 70 and the open position providing access to the liftgate opening 70. The vehicle roof 12, body side 32s, and/or a rear bumper may define the liftgate opening 70. In the open position, the first end 62 of the liftgate 14 is adjacent the vehicle roof 12 and the fourth end 68 is spaced from the vehicle body.

Figure 4:
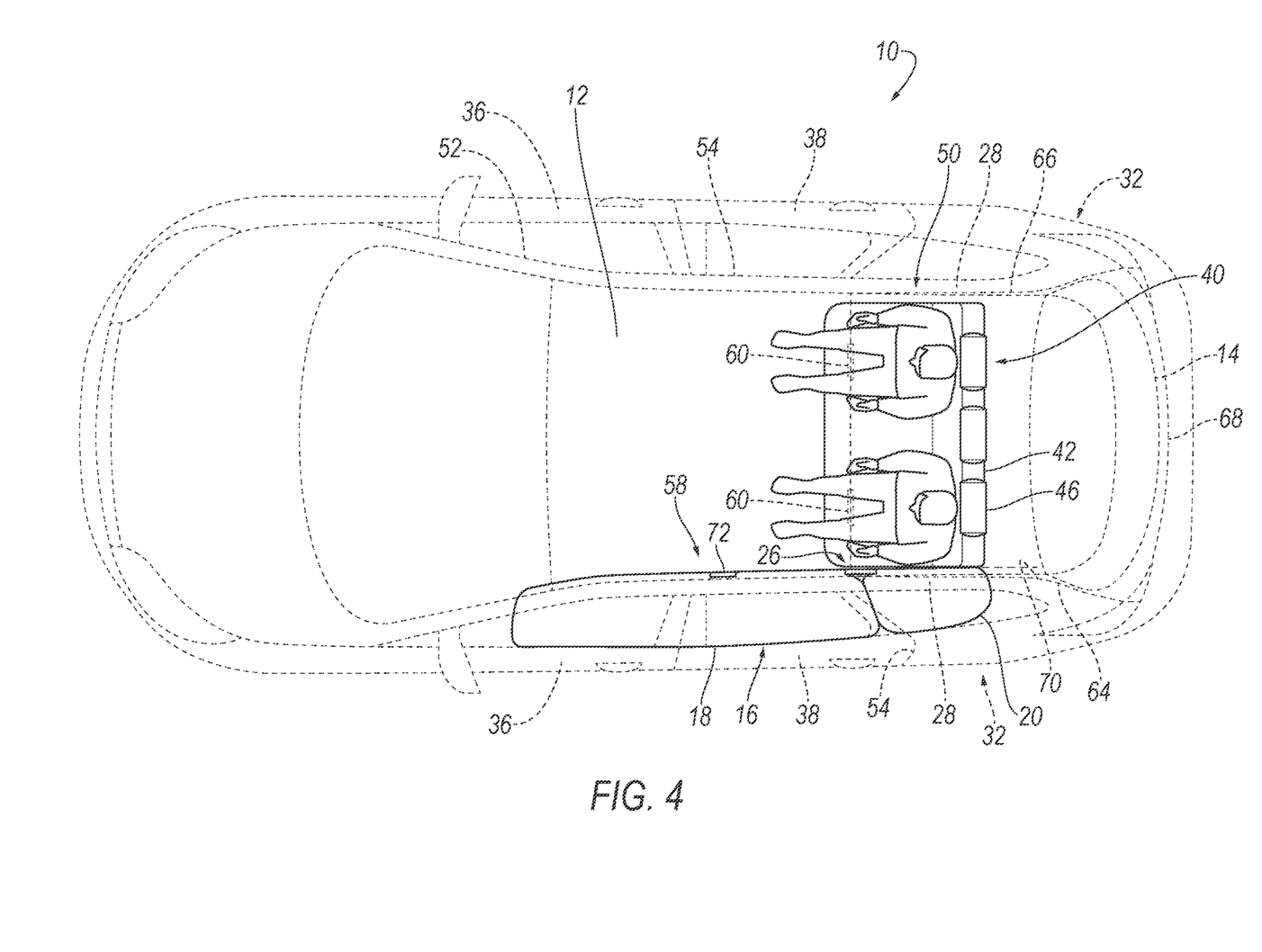
FIG. 4 is a top view of the vehicle with the airbag in the inflated position.
Figure 5:
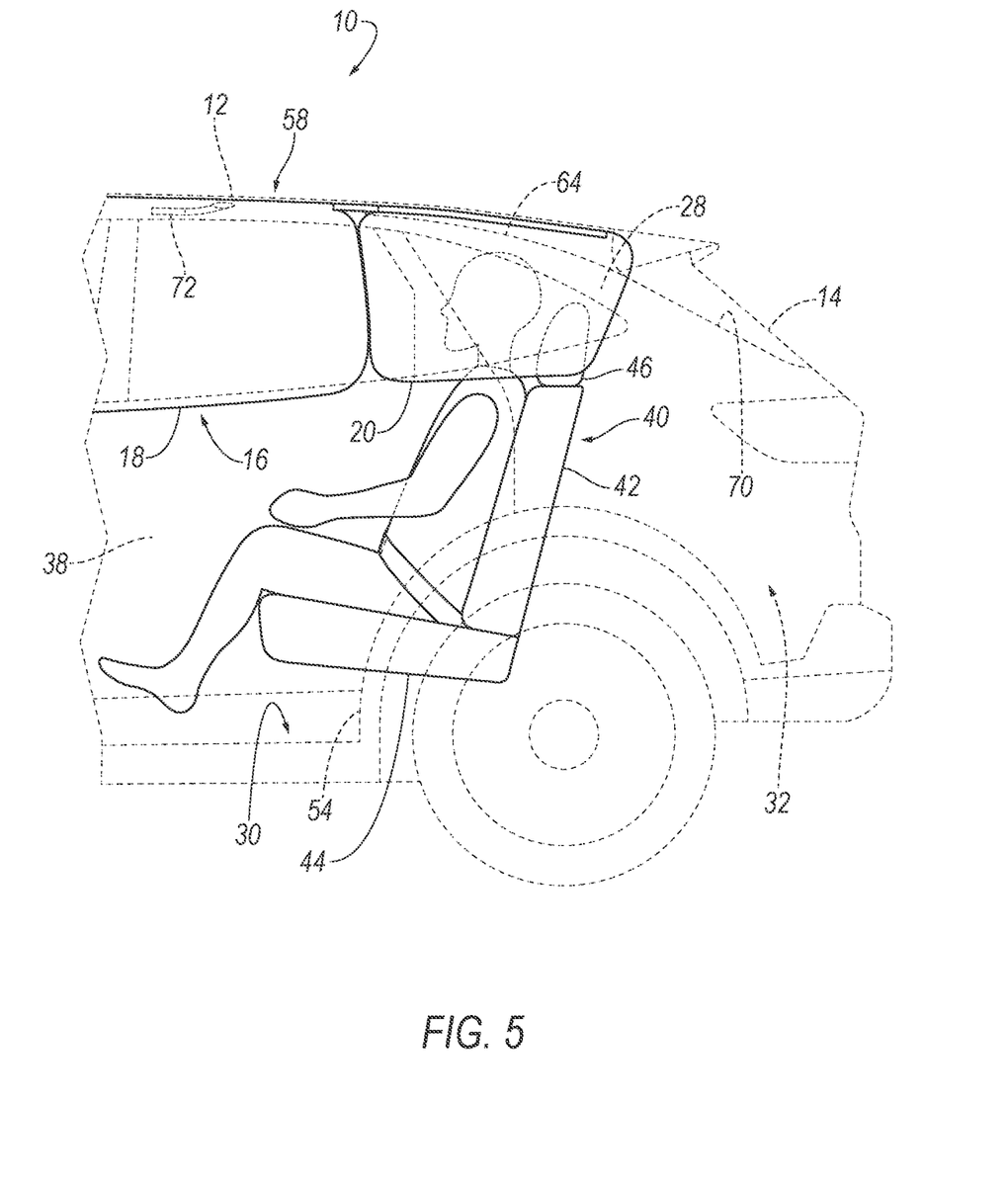
FIG. 5 is a side view of the vehicle with the airbag in the inflated position.

The first end 62 of the liftgate 14 is elongated along the vehicle roof 12. Specifically, the first end 62 of the liftgate 14 is elongated in the cross-vehicle 10 direction between each body side 32. In the example shown in the Figures, the first end 62 is adjacent the vehicle roof 12. The second end 64 and the third end 66 are spaced from each other cross-vehicle 10. In the example shown in the Figures, the second end 64 and the third end 66 each extend from the first end 62 away from the vehicle roof 12. Specifically, the second end 64 and the third end 66 may be adjacent the body side 32s, respectively, when the liftgate 14 is in the closed position. The fourth end 68 is spaced from the first end 62 and the second end 64 and third end 66 extend from the first end 62 to the fourth end 68. The fourth end 68 is below the first end 62 when the liftgate 14 is in the closed position, as shown in FIGS. 4-5. The fourth end 68 may be adjacent to the rear bumper when the liftgate 14 is in the closed position.

As set forth above, the liftgate 14 is adjacent to the vehicle roof 12. Specifically, the liftgate 14 is connected to the vehicle roof 12, e.g., pivotably connected. For example, as set forth above, the hinge 60 connects the liftgate 14 to the vehicle roof 12. In the example shown in the Figures, the hinge 60 is between the liftgate 14 and the vehicle roof 12 and pivotably connects the liftgate 14 and the vehicle roof 12. Specifically, the hinge 60 is on the first end 62 of the liftgate 14. Specifically, the hinge 60 pivotably connects the first end 62 of the liftgate 14 to the vehicle roof 12. The liftgate 14 pivots relative to the vehicle roof 12 from the closed position to the open position about the hinge 60.

The liftgate 14 is above the seat 40 in the closed position. In other words, a vertical line from the seat 40 extends through the liftgate 14 when the liftgate 14 is in the closed position. The liftgate 14 is above the head restraint 46 of the seat 40 in the closed position. As shown in the example, in the Figures, the liftgate 14 is above each of the seats 40, and more specifically the head restraint 46 of each of the seats 40, of the rear row 50.

As set forth above, the vehicle 10 includes at least one airbag assembly 58. The airbag assembly 58 includes at least one inflator 72 that inflates the airbag 16 with inflation medium, as described further below. As shown in the example shown in the Figures, the airbag 16 is a side curtain airbag. One airbag assembly 58 is on a left side of the vehicle is shown in the Figures and the vehicle may include another airbag assembly 58 on a right side of the vehicle 10.

The airbag 16 is supported by the vehicle roof 12 and the liftgate 14. In other words, the weight of the airbag 16 is borne by the vehicle roof 12 and the liftgate 14 in both the uninflated position and the inflated position. Specifically, the first segment 18 is supported by the vehicle roof 12 and the second segment 20 is supported by the liftgate 14.

Figure 2:
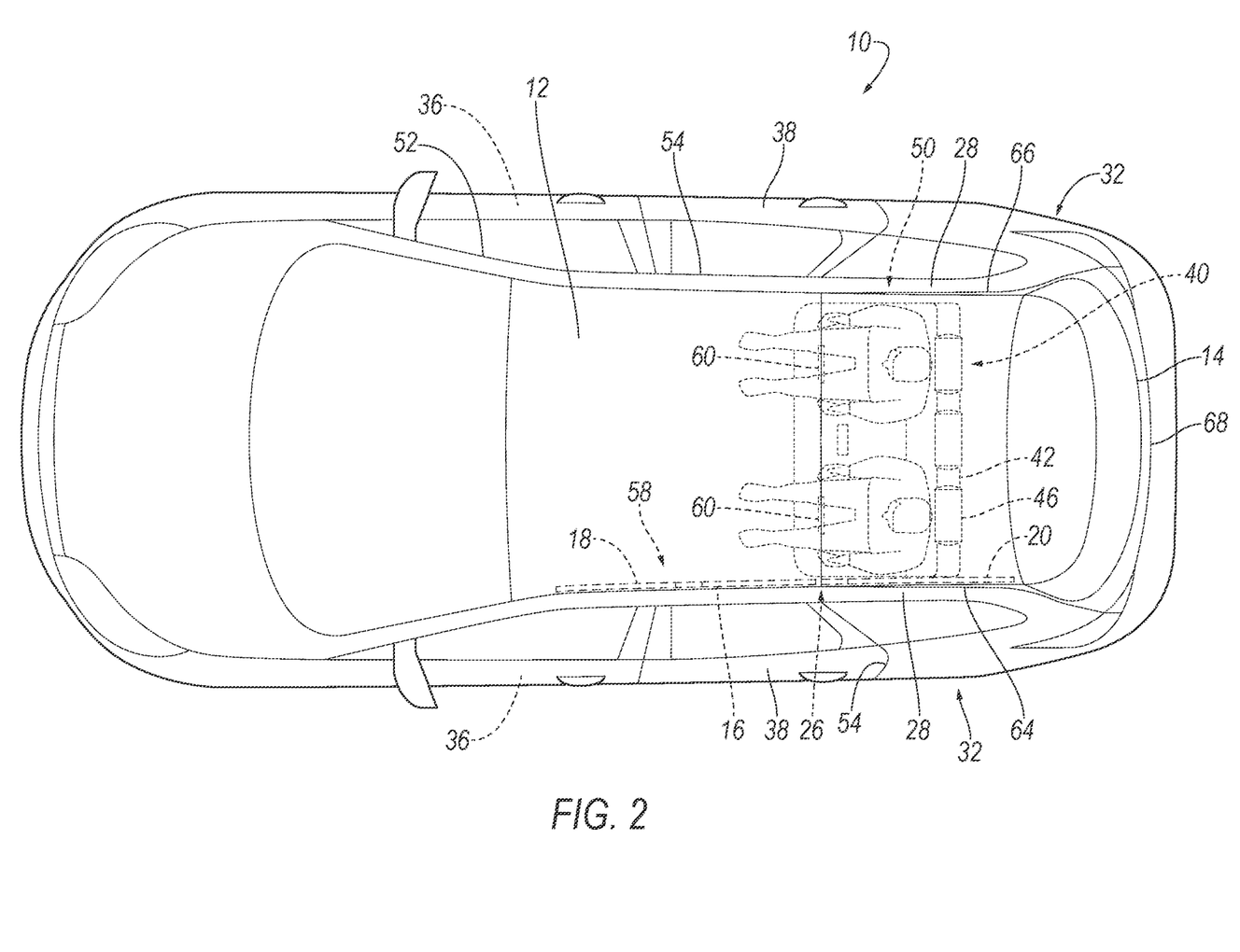
FIG. 2 is a top view of an example of the vehicle with the airbag in the uninflated position.
Figure 3:
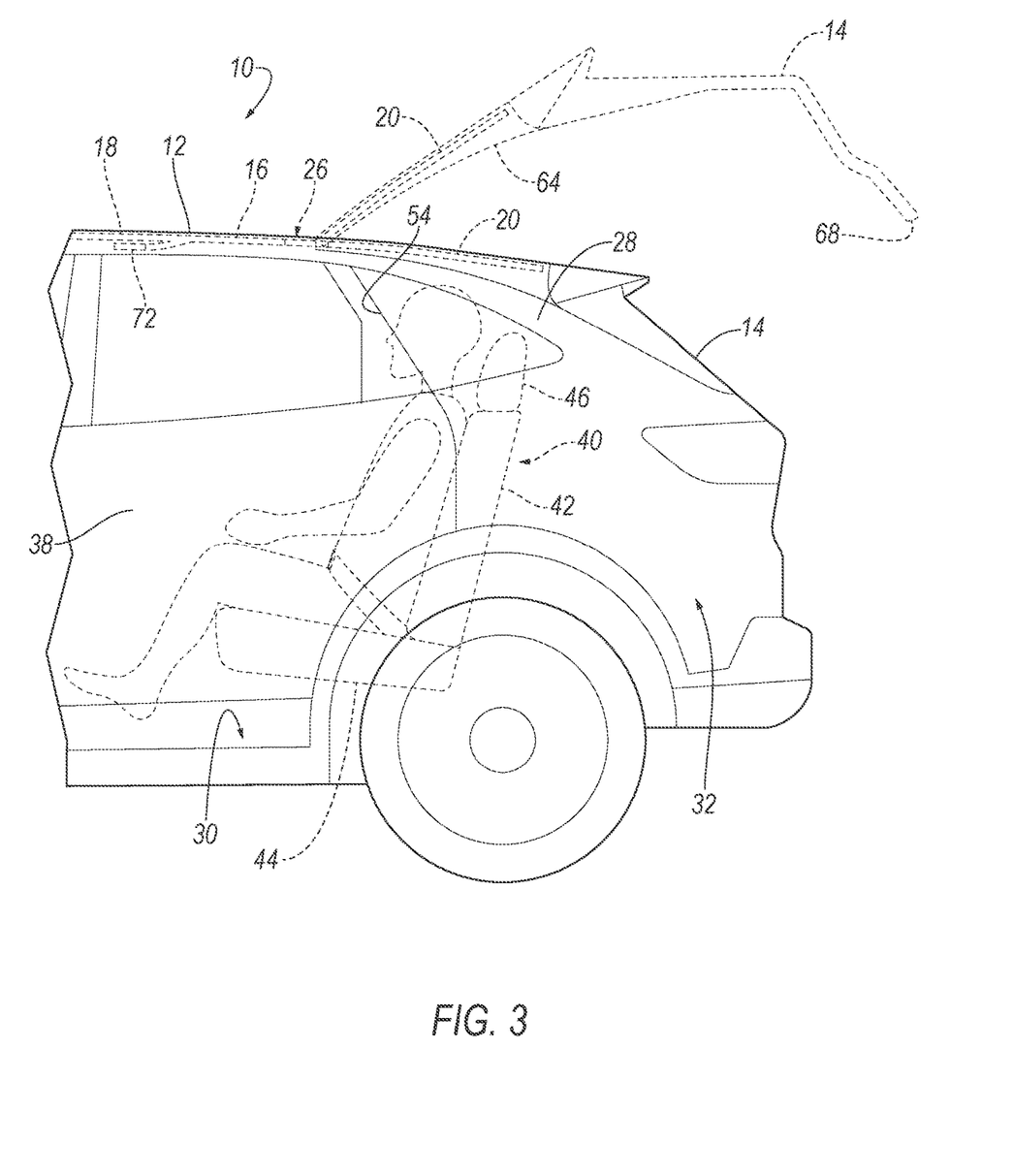
FIG. 3 is a side view of the vehicle with the airbag in the uninflated position with the liftgate shown in an open position in broken lines.
Figure 6:
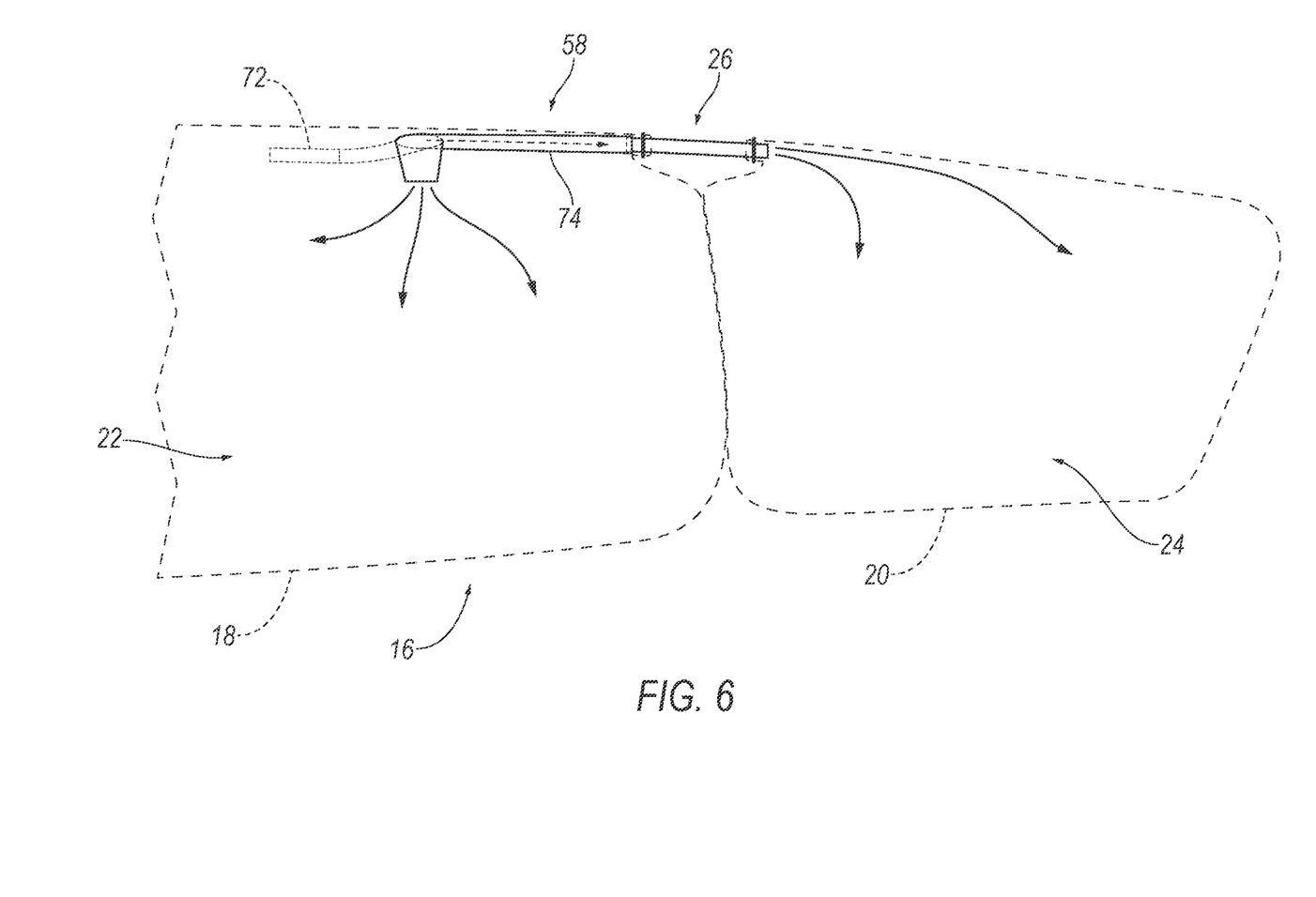
FIG. 6 is a side view of the airbag in the inflate position.

The first segment 18 is supported by the vehicle roof 12 when the liftgate 14 is in the open position and the closed position. The first segment 18 remains stationary relative to the vehicle roof 12 when the liftgate 14 is moved between the open position and the closed position. The first segment 18 may be supported directly by the vehicle roof 12, i.e., with no components between the first segment 18 and the vehicle roof 12. For example, the first segment 18 may be connected to the roof rail. When the liftgate 14 is in the closed position, the first segment 18 is inflatable downwardly from the vehicle roof 12 from the uninflated position, as shown in FIGS. 2 and 3, to an inflated position, as shown in FIGS. 4-6. The first segment 18 is supported by the vehicle roof 12 in the uninflated position and in the inflated position. The first segment 18 may be mounted to the vehicle roof 12 with fasteners, e.g., clips, threaded fasteners, etc. The first segment 18 may be rolled or folded in the uninflated position, e.g., between the vehicle roof 12 and a headliner, and extends downwardly from the vehicle roof 12 toward the floor in the inflated position.

The second segment 20 is supported by the liftgate 14 when the liftgate 14 is in the open position and the closed position. In other words, the airbag 16 is an aft-vehicle airbag. The second segment 20 moves with the liftgate 14 between closed position and open position. In other words, the second segment 20 and the liftgate 14 move as a unit when the liftgate 14 is moved between the closed position and the open position, as shown in FIG. 3. The second segment 20 is supported directly by the liftgate 14, i.e., with no components between the second segment 20 and the liftgate 14. For example, the second segment 20 may be connected to one of the panels of the liftgate 14. The second segment 20 may be concealed by one of the trim panels of the liftgate 14. When the liftgate 14 is in the closed position, the second segment 20 is inflatable downwardly from the liftgate 14 from the uninflated position, as shown in FIGS. 2 and 3, to an inflated position, as shown in FIGS. 4-6. The second segment 20 is supported by the liftgate 14 in the uninflated position and in the inflated position. The second segment 20 may be mounted to the liftgate 14 with fasteners, e.g., clips, threaded fasteners, etc. The second segment 20 may be rolled or folded in the uninflated position, e.g., between the panel of the liftgate 14 and the trim panel of the liftgate 14, and extends downwardly from the liftgate 14 toward the floor in the inflated position.

As set forth above, the first segment 18 of the airbag 16 defines the first inflation chamber 22 and the second segment 20 of the airbag 16 defines the second inflation chamber 24. The conduit 26 fluidly connects the first inflation chamber 22 and the second inflation chamber 24. In other words, inflation medium freely flows between the first inflation chamber 22 and the second inflation chamber 24 through the conduit 26 during inflation of the airbag 16.

An inflator 72 in fluid communication with the first segment 18, the second segment 20, and the conduit 26. In the example shown in the Figures, the inflator 72 is in fluid communication directly with the first segment 18. For example, a component of the inflator 72 is in the first inflation chamber 22 to directly inflate the first inflation chamber 22. In such an example, the conduit 26 and the second segment 20 are inflatable with inflation medium from the inflator 72 through the first segment 18. In other words, the inflation medium flows from the first inflation chamber 22, through the conduit 26, to the second inflation chamber 24. Specifically, in the example shown in the Figures, the airbag 16 includes a diffuser tube 74 extending through the first segment 18 from the inflator 72 to the conduit 26. Inflation medium flows through the diffuser tube 74 to the conduit 26 and from the conduit 26 to the second segment 20. In other examples, the inflation medium may flow from the inflator 72 into the first inflation chamber 22 and from the first inflation chamber 22 into the conduit 26.

The conduit 26 is flexible relative to the vehicle roof 12 and the liftgate 14. As the liftgate 14 is moved relative to the vehicle roof 12 between the closed position and the open position, the conduit 26 flexes relative to the vehicle roof 12 and/or the liftgate 14. Specifically, as the liftgate 14 moves relative to the vehicle roof 12 between the closed position and the open position, the first segment 18 remains stationary relative to the vehicle roof 12 and the second segment 20 moves with the liftgate 14 relative to the vehicle roof 12 and the conduit 26 flexes to allow this relative movement.

The conduit 26 may be connected to the first segment 18 and the second segment 20 in any suitable fashion. In the example, shown in FIG. 6, a portion of the conduit 26 is sewn to the first segment 18 and the second segment 20.

The conduit 26 may be supported by the first segment 18 and the second segment 20. In addition, the vehicle 10 may include other support devices that support the conduit 26 directly to the vehicle roof 12 and/or the liftgate 14, e.g., straps, brackets, etc., extending from the vehicle roof 12 and/or the liftgate 14 for supporting the conduit 26 between the first segment 18 and the second segment 20.

The airbag 16, including the first segment 18 and the second segment 20, may be fabric, e.g., a woven polymer yarn. At least a portion of the conduit 26 may be fabric, e.g., a woven polymer yarn, and in such examples may be of the same type of material as the first segment 18 and the second segment 20. In such an example, at least a portion 76 of the conduit 26. i.e., the fabric portion 76, is sewn to the first segment 18 and the second segment 20, e.g., by stitching, one-piece woven manufacturing, etc. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

Figure 7:
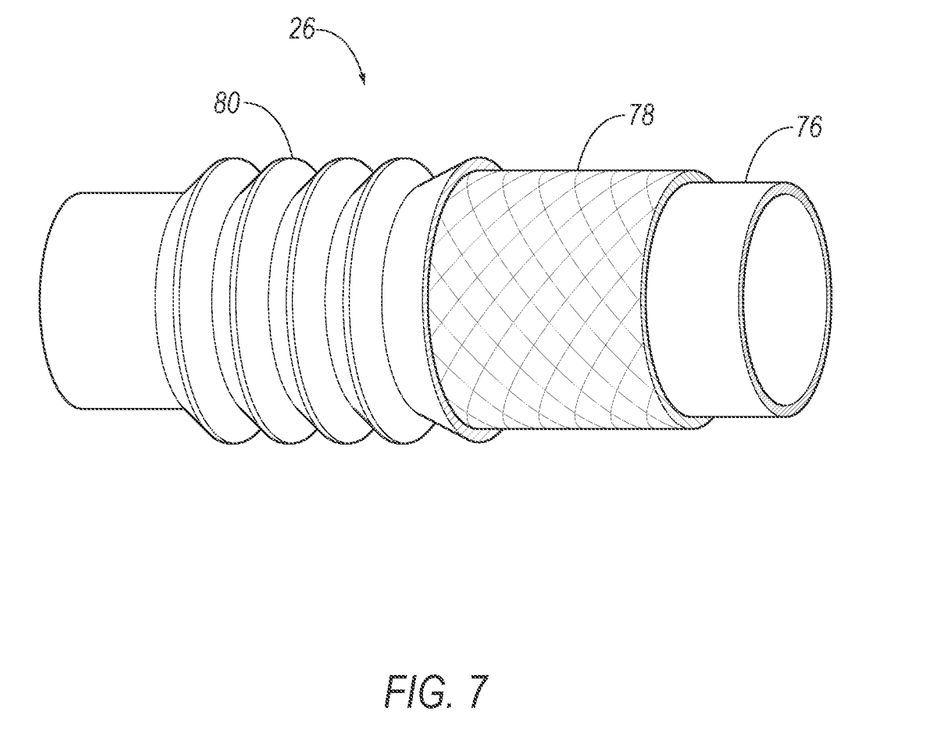
FIG. 7 is a cut-away view of a conduit of the airbag.

As set forth above, at least a portion 76 of the conduit 26 may be fabric. Specifically, with reference to FIG. 7, the conduit 26 may include a fabric defining a fluid path between the first segment 18 and the second segment 20. In such an example, the fabric may be tubular, i.e., a hollow cylinder. The conduit 26 may include an abrasion-resistant covering. For example, the conduit 26 may include a sheath 78 exterior to the fabric portion 76. The sheath 78 may be, for example, braided. The sheath 78, for example, may be metal, composite fiber, etc. The sheath 78 may be supported directly by the vehicle roof 12 and/or the liftgate 14 or the sheath 78 may be supported directly by the fabric portion 76. The conduit 26 may be waterproof to prevent intrusion of water to the fabric of the conduit 26 and/or the first segment 18 and the second segment 20. As an example, the conduit 26 may include an accordion boot 80 exterior to the fabric portion 76 of the conduit 26. In examples including a sheath 78, the accordion boot 80 may be exterior to the sheath 78. The accordion boot 80 may be, for example rubber. The accordion boot 80 may be connected to the vehicle roof 12 and the liftgate 14 to prevent intrusion of water to the airbag 16 as well as to the vehicle roof 12 and the liftgate 14. FIG. 7 shows a cut-away portion of the conduit 26 at various points to show the fabric portion 76, the sheath 78, and the accordion boot 80.

The inflator 72 is in fluid communication with the airbag 16. The inflator 72 expands the airbag 16 with inflation medium, such as a gas, to move the airbag 16 from the uninflated position to the inflated position. The inflator 72 may be supported by any suitable component. For example, the inflator 72 may be supported by the vehicle roof 12. The inflator 72 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 72 may be, for example, at least partially in the inflation chamber to deliver inflation medium directly to the inflation chamber or may be connected to the inflation chamber through fill tubes, diffusers, etc.

The first segment 18 and the second segment 20 are elongated along vehicle-longitudinal axis L. The first segment 18 in the inflation position may extend along the front vehicle door 36 and the rear vehicle door 38, as shown in the example shown in the Figures. In such an example, the first segment 18 may control the kinematics of one or more occupants in the front row of seats 40 during certain vehicle impacts and the second segment 20 may control the kinematics of an occupant in the rear row 50 of seats 40 during certain vehicle impacts. The second segment 20 in the inflated position is adjacent the seatback 42. Specifically, the second segment 20 of the airbag 16 in the inflated position is above the seatback 42 and vehicle-outboard of the head restraint 46. In such an example, the second segment 20 may control the kinematics of the head of an occupant in the rear row 50 of seats 40.

In the example shown in FIGS. 2 and 4, the first segment 18 and the second segment 20 are coaxial. In the example shown in FIG. 8, in the inflated position, the first segment 18 includes a first leg 82 elongated vehicle-forward of the second segment 20 and a second leg 84 elongated cross-vehicle from the first leg 82. In such an example, the second segment 20 of the airbag 16 is inflatable to an inflated position adjacent the seatback 42, as set forth above, and the first leg 82 of the first segment 18 of the airbag 16 is vehicle-forward of the seatback 42.

Figure 8:
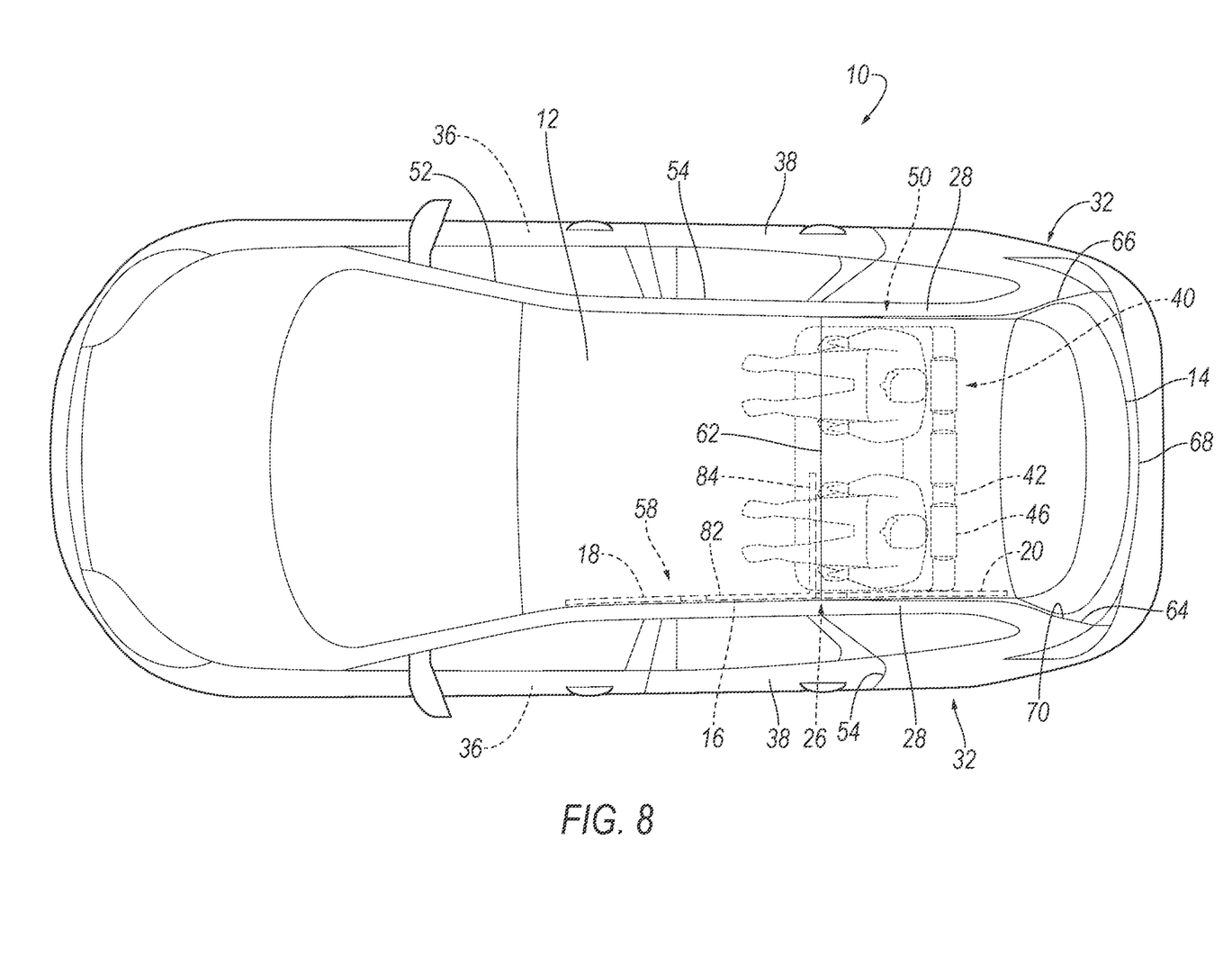
FIG. 8 is a top view of the vehicle including another example of the airbag.

Specifically, the second segment 20 is vehicle-outboard of the head restraint 46 and the second leg 84 of the first segment 18 is vehicle-forward of the head restraint 46. In such an example, the second leg 84 may control the kinematics of the head of an occupant in the rear row 50 of seats 40, as described above, and the first segment 18 may control the kinematics of that occupant, e.g., head, chest, and torso, during certain vehicle impacts.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle roof;
   a liftgate rotatably connected to the vehicle roof; and
   an airbag having a first segment and a second segment and being inflatable from an uninflated position to an inflated position;
   the first segment of the airbag defining a first inflation chamber and the second segment of the airbag defining a second inflation chamber;
   the airbag including a conduit fluidly connecting the first inflation chamber and the second inflation chamber; and
   the first segment of the airbag being supported by the vehicle roof in an uninflated position and an inflated position, and the second segment of the airbag being supported by the liftgate in an uninflated position and in an inflated position.

2. The vehicle as set forth in claim 1, wherein the conduit is flexible relative to the vehicle roof and the liftgate.

3. The vehicle as set forth in claim 1, wherein the first segment, the second segment, and the conduit are fabric.

4. The vehicle as set forth in claim 1, wherein the liftgate is moveable relative to the vehicle roof between a closed position and an open position, the second segment being moveable with the liftgate between the closed position and the open position.

5. The vehicle as set forth in claim 4, wherein the first segment is mounted to the vehicle roof in an uninflated position and remains stationary relative to the vehicle roof when the liftgate moves relative to the vehicle roof between the closed position and the opened position.

6. The vehicle as set forth in claim 1, further comprising a seat having a seatback, the second segment of the airbag being inflatable to the inflated position adjacent the seatback.

7. The vehicle as set forth in claim 1, further comprising a seat having a seatback and a head restraint supported by the seatback, the second segment of the airbag being inflatable to the inflated position above the seatback and vehicle-outboard of the head restraint.

8. The vehicle as set forth in claim 1, further comprising a seat, the liftgate being above the seat.

9. The vehicle as set forth in claim 1, wherein the first segment of the airbag is inflatable to the inflated position elongated in a direction vehicle-forward from the second segment.

10. The vehicle as set forth in claim 1, further comprising a front vehicle door and a rear vehicle door, the first segment being inflatable to the inflated position extending along the front vehicle door and the rear vehicle door.

11. The vehicle as set forth in claim 1, further comprising an inflator in fluid communication with the first segment, the second segment, and the conduit.

12. The vehicle as set forth in claim 11, wherein the inflator is in fluid communication directly with the first segment, and the conduit and the second segment are inflatable with inflation medium from the inflator through the first segment.

13. The vehicle as set forth in claim 12, further comprising a diffuser tube extending through the first segment from the inflator to the conduit.

14. The vehicle as set forth in claim 11, wherein the inflator is supported by the vehicle roof.

15. The vehicle as set forth in claim 1, wherein the first segment includes a first leg inflatable to the inflated position elongated vehicle-forward of the second segment and a second leg inflatable to the inflated position elongated cross-vehicle from the first leg.

16. The vehicle as set forth in claim 15, further comprising a seat having a seatback, the second segment of the airbag being inflatable to the inflated position adjacent the seatback and the first leg of the first segment of the airbag being inflatable to the inflated position vehicle-forward of the seatback.

17. The vehicle as set forth in claim 16, wherein the seat includes a head restraint supported by the seatback, the second segment in the inflated position being vehicle-outboard of the head restraint and the second leg of the first segment in the inflated position being vehicle-forward of the head restraint.

18. The vehicle as set forth in claim 1, wherein the first segment and the second segment are elongated along a vehicle-longitudinal axis.

* * * * *